No. 740,606. Patented October 6, 1903.

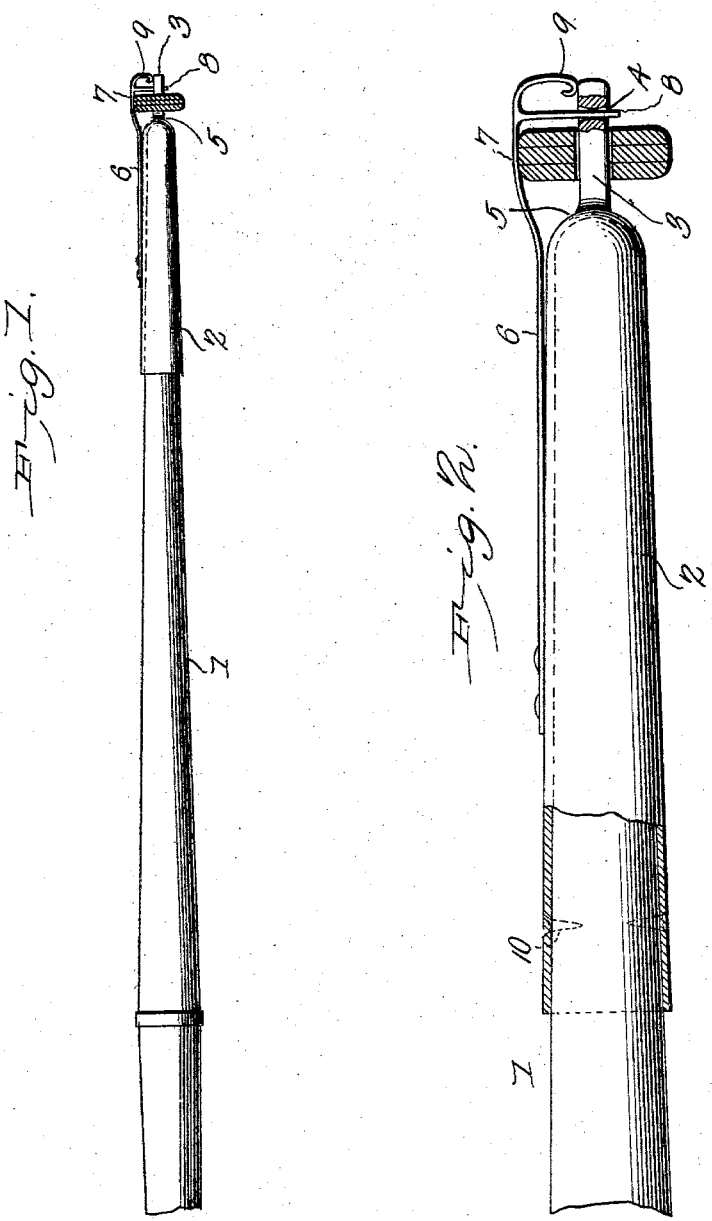

UNITED STATES PATENT OFFICE.

JUSTUS EARL TAYLOR, OF GRIDLEY, ILLINOIS.

WHIFFLETREE-HOOK.

SPECIFICATION forming part of Letters Patent No. 740,606, dated October 6, 1903.

Application filed August 13, 1903. Serial No. 169,394. (No model.)

*To all whom it may concern:*

Be it known that I, JUSTUS EARL TAYLOR, a citizen of the United States, residing at Gridley, in the county of McLean and State of Illinois, have invented a new and useful Whiffletree-Hook, of which the following is a specification.

This invention relates to the general class of whiffletrees, but more particularly to a tug-fastener therefor.

One of the principal objects of this invention is to provide a simple construction of fastener which may readily be applied to the common construction of whiffletree and which will effectually maintain engagement with the tug.

A further object of the invention is to provide a guard or lock for holding the tug in engagement with the whiffletree, so that the guard or lock will not be liable to be disturbed by the engagement of the harness therewith or from other causes.

Further objects and advantages of this invention will appear in the following description, and the novel features thereof will be particularly pointed out in the appended claims, it being understood that changes in the form, proportion, and the minor details of construction may be resorted to without departing from the spirit or sacrificing any of the advantages of this invention.

In the drawings, Figure 1 is a view in side elevation of the tug-fastener applied, and Fig. 2 is a similar view with the fastener partly in section.

The reference-numeral 1 designates a whiffletree in the respective ends of which are secured duplicate tug-fasteners.

Each fastener is illustrated as comprising a strengthening-sleeve 2, which fits over and incloses the end of the whiffletree to reinforce and add rigidity thereto. On the end of the sleeve and forming a part thereof is a reduced extension 3, provided with an eye or opening 4. The extension is designed to fit through an opening in the tug, which when in position will rest between the eye and the shoulder 5, formed at the juncture of the extension with the sleeve. 6 designates a guard or lock which is terminally fastened to the sleeve, extending lengthwise thereof in the form of a spring, with an arched or bowed portion 7, coextensive with the extension 3 and carrying a bolt or pin 8, which is normally in engagement with the eye in the extension, so that the tug will be efficiently secured to the whiffletree. The end 9 of the guard is inbent and normally rests against the extension of the sleeve, and as the bowed portion of the guard is devoid of angles it will be impossible for the lines or other parts of the harness to engage therewith, so as to accidentally lift the bolt out of engagement with the eye, and thus release the tug.

The bent terminal 9 serves as a lift, so that when it is necessary to lift the bolt out of engagement with the eye to attach or detach the tug this can easily be accomplished.

In actual practice the sleeve will be of such length as will effectually reinforce the whiffletree, and fastening devices 10 may be used to secure the two together. It will be apparent that inasmuch as the parts of the fastener are all carried by the sleeve the whiffletree can readily be provided with the devices without altering the construction thereof.

I claim—

1. A tug-fastener for whiffletrees, comprising a sleeve having a terminal extension with an eye therein, and a guard carried by the sleeve, and provided with a bolt for engagement with the eye, said guard having a bowed portion terminating in an inbent end normally contacting with the extension.

2. A tug-fastener for whiffletrees comprising an end-inclosing sleeve, having a terminal extension and means for locking the tug to the extension, and having a bowed portion with a sleeve-contacting terminal.

In testimony that I claim the foregoing as my own I have hereto affixed my signature in the presence of two witnesses.

JUSTUS EARL TAYLOR.

Witnesses:
JOHN A. TAYLOR,
W. H. SETTLE.